March 3, 1959   W. D. BOHANNON, JR   2,876,328
SOLDERING IRONS
Filed Nov. 26, 1956
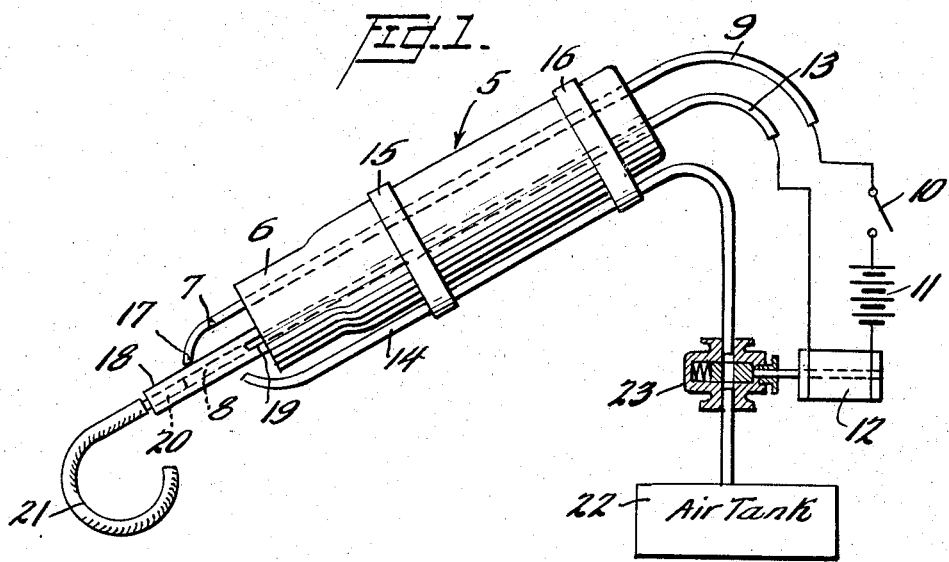
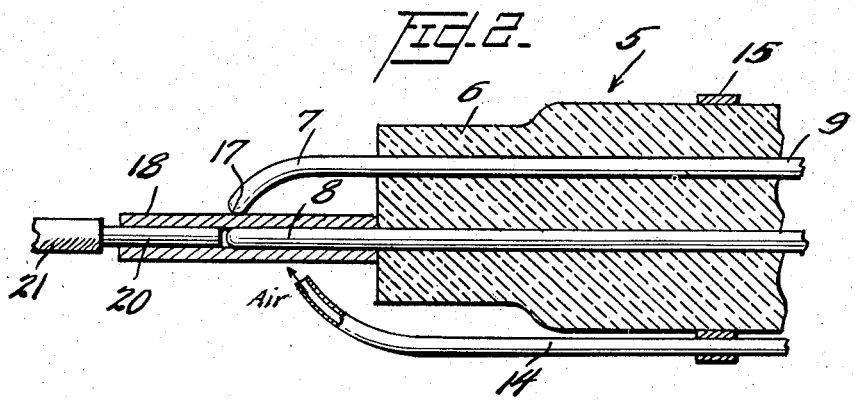
INVENTOR
William D. Bohannon, Jr.,
BY   H. J. Winegar
ATTORNEY

United States Patent Office 2,876,328
Patented Mar. 3, 1959

2,876,328

SOLDERING IRONS

William D. Bohannon, Jr., Burlington, N. C., assignor to Western Electric Company, Incorporated, New York, N. Y., a corporation of New York Application November 26, 1956, Serial No. 624,375

6 Claims. (Cl. 219—26)

This invention relates to soldering irons and more particularly to resistance soldering irons for attaching terminals onto wires.

It is an object of the present invention to provide a soldering iron which is of simple construction and highly effective.

Another object of the invention is the provision of a soldering iron for soldering terminals onto wires.

A still further object of the invention is to provide a soldering iron for use in applying tubular terminals onto wires which may be closely spaced one from another. Soldering irons illustrating certain features of the invention may be provided for attaching terminals onto wires which include a pair of electrodes to which current may be supplied. Preferably the electrodes are mounted in spaced relation one to another so that a terminal to be attached may be held between the electrodes. Affixed to the mounting for the electrodes is means for directing coolant onto the terminal after it is attached to the wire.

A complete understanding of the invention may be had by reference to the following detailed description, when considered in conjunction with the accompanying drawing wherein:

Fig. 1 is a view of a soldering iron made in accordance with the present invention shown in operative relation to a terminal and the wire onto which the terminal is being soldered, and Fig. 2 is a longitudinal sectional view taken through the forward end of the apparatus shown in Fig. 1.

Referring now to the drawing wherein like reference characters designate the same parts in the several views, a resistance type soldering iron designated generally by the numeral 5 comprises a block of electric and heat insulating material 6 in which there is suitably mounted a pair of metallic electrodes 7 and 8. The electrode 7 extends through the block 6 and is connected by means of a flexible wire 9 to a switch 10. The switch 10 serves to connect power from a suitable source 11 through a solenoid 12 to a conductor 13 which is connected to the electrode 8. The block of insulating material 6 is in the form of a handle which may be manipulated by the operator and has an air tube 14 mounted on it. The air tube 14 may be attached to the block of insulating material 6 in any suitable manner, for example, by means of tie strips 15 and 16.

By reference to Fig. 2 it will be seen that the electrode 7 is bent so as to provide a contacting and a clamping portion 17 to be engaged with the outer surface of a tubular resilient terminal 18. In the embodiment of the invention shown in Fig. 2, the electrode 8 extends outwardly from the block of insulating material 6 to a point just short of the portion 17 of electrode 7, whereby when a tubular terminal 18 is slipped onto the electrode 8 it will be clamped resiliently between the electrode 8 and the electrode 7. The tubular terminal 18 may be slotted as shown at 19 (Fig. 1) so that it may clamp onto any connector to be associated with it in apparatus where the terminal is used. The electrode 8 may be made longer or shorter than that shown in Fig. 2 depending upon the distance into the terminal that it is desired to insert a wire 20 on which the terminal 18 is to be mounted. In the various figures the wire 20 is shown provided with suitable insulation 21 and a plurality of wires may be held in a fixture in close proximity one to another and the terminals 18 may then be mounted upon the wires and soldered thereto.

In the operation of the apparatus, the exposed end of the wire 20 is tinned by any suitable tinning devices. Thereafter, terminals 18 which it is desired to mount upon wires 20 may be slipped successively onto the electrode 8 where each terminal will be clamped by the electrode 7. When a terminal is so positioned, a blast of air from the tube 14 may be directed onto the terminal from a source of air under pressure indicated diagrammatically at 22. The air from the source 22 is passed through a valve 23, also shown diagrammatically and normally in its open position, so that air will be fed through the valve 23 and tube 14 to impinge upon a terminal 18 mounted on the electrode 8. The solenoid 12 is connected in circuit with the electrodes 7 and 8 when the switch 10 is closed. Thus, at all times, when current is being fed to the electrodes 7 and 8, the solenoid 12 will be actuated. Consequently, the valve 23 will be closed.

In using the apparatus, a terminal 18 is mounted in position between the electrodes 7 and 8. The switch 10 is then closed to supply current to the electrodes 7 and 8 and through the terminal 18 thereby to heat the terminal due to the resistance to the passage of current through it. After the terminal is heated, which occurs in a very short time, the end of the terminal held between the electrodes may be dipped into a solder pot to cause solder to be drawn up into the terminal to the point where the electrode 8 blocks further solder from going into the terminal. Thereupon the terminal 18 with the solder in it may be pushed onto the bared end of the wire 20 and held there for sufficient time for the solder to wet the wire 20. Then the switch 10 may be opened and a jet of air will be directed through the released valve 23 onto the terminal. When the switch 10 is opened, the current through the electrodes 7 and 8 is interrupted and the jet of air causes the solder to cool rapidly and solidify. This greatly reduces the hold-time required for the solder to solidify, thereby increasing the over all efficiency of the soldering operation cycle and substantially reducing the number of defects due to "cold-flow" solder joints. It will be understood that the length of the electrode 8 may be varied to determine the amount of solder drawn up into a terminal mounted on it and also to control the distance into the terminal that the wire 20 will move when the terminal is placed on the wire 20.

Other modifications of this structure may be made without departing from the invention.

What is claimed is:

1. A soldering iron for use in attaching a wire into a hollow tubular terminal to a predetermined depth comprising a body portion, an electrode mounted on said body for reception of said terminal thereover, a second electrode also mounted on said body portion and positioned for engagement with the outer surface of the terminal such that said terminal is held by the electrodes in position for reception of the wire to be inserted in the terminal, means for supplying current to said electrodes, a switch for controlling said current supplying means, means on said body for directing coolant onto a terminal held between said electrodes, and a coolant supply under control of said switch.

2. A soldering iron for use in attaching a wire into a hollow tubular terminal to a predetermined depth comprising a body portion, an electrode mounted on said body for reception of said terminal thereover, a second electrode also mounted on said body portion and positioned for engagement with the outer surface of the terminal such that said terminal is held by the electrodes in position for reception of the wire to be inserted in the terminal, a current source, means interconnecting said current source and said electrodes including a switch and a solenoid, a coolant supply, and means controlled by said solenoid for directing coolant from said supply to a terminal engaged by said electrodes.

3. A soldering iron for use in attaching a wire into a hollow tubular terminal to a predetermined depth comprising a body portion, an electrode mounted on said body portion for reception of said terminal thereover, a second electrode also mounted on said body portion and positioned for engagement with the outer surface of the terminal such that said terminal is held by the electrodes in position for reception of the wire to be inserted in the terminal, a current source, a switch for connecting current from said source to said electrodes, a coolant supply and a valve also controlled by said switch and normally open to direct coolant from said supply to a terminal engaged by said electrodes.

4. A soldering iron for use in attaching a wire into a hollow tubular terminal comprising a handle including a body portion, a pair of electrodes extending from said body, one of said electrodes being resilient and the other of said electrodes being of a predetermined length to extend into the tubular terminal a predetermined distance, said other electrode being positioned for engagement with the outer surface of the terminal to be placed on the said other electrode such that the terminal will be resiliently held in place thereon by the resilient electrode, means for supplying current to said electrodes including a switch, and means mounted on said body and operative under control of said switch for directing coolant onto a terminal held by said electrodes.

5. A soldering iron for use in attaching a wire into a hollow tubular terminal to a predetermined depth comprising a body portion, a pair of electrodes mounted on said body portion for engaging said terminal onto one electrode and between them to resistance heat the terminal, a current supply source, a source of compressed air, an air tube mounted on said body for directing a jet of air from said source of compressed air onto a terminal held between the electrodes, a valve intermediate the air tube and source of compressed air, and a switch operable in one position to connect the current supply source to said electrodes and to supply power for closing said valve and operable to another position to disconnect the electrodes from the current source and also to actuate the valve to supply compressed air through the air tube to cool the terminal.

6. A soldering iron for use in attaching a wire into a hollow tubular terminal to a predetermined depth comprising a body portion, a pair of electrodes mounted on said body portion for engaging the terminal onto one of said electrodes and between them to resistance heat the terminal, a current supply source, a source of compressed air, an air tube mounted on said body for directing a jet of air from said source of compressed air onto the terminal held between the electrodes, a valve intermediate the air tube and source of compressed air, a solenoid for actuating said valve connected in series between the current supply source and the electrodes and operable to close said valve, and a switch also connected in series between the current supply source and the electrodes.

References Cited in the file of this patent

UNITED STATES PATENTS

| | | |
|---|---|---|
| 1,630,990 | Wagg | May 31, 1927 |
| 1,788,201 | Murray et al. | Jan. 6, 1931 |
| 2,221,646 | McPherson | Nov. 12, 1940 |
| 2,449,521 | Warner | Sept. 14, 1948 |
| 2,516,194 | Faudree et al. | July 25, 1950 |
| 2,604,571 | Naulty et al. | July 22, 1952 |
| 2,789,198 | Dye et al. | Apr. 16, 1957 |
| 2,790,059 | Burnett | Apr. 23, 1957 |
| 2,792,485 | Brown | May 14, 1957 |